(12) United States Patent
Xu et al.

(10) Patent No.: US 11,607,613 B2
(45) Date of Patent: Mar. 21, 2023

(54) METHOD AND APPARATUS FOR SWITCHING GAME MODE, AND ELECTRONIC DEVICE

(71) Applicant: Shanghai Yiyu Network Technology Co., Ltd., Shanghai (CN)

(72) Inventors: Zhiqin Xu, Shanghai (CN); Mei Peng, Shanghai (CN)

(73) Assignee: Shanghai Yiyu Network Technology Co., Ltd., Shanghai (CN)

( * ) Notice: Subject to any disclaimer, the term of this patent is extended or adjusted under 35 U.S.C. 154(b) by 0 days.

(21) Appl. No.: 17/364,875

(22) Filed: Jun. 30, 2021

(65) Prior Publication Data

US 2022/0274024 A1 Sep. 1, 2022

Related U.S. Application Data

(63) Continuation of application No. PCT/CN2021/097404, filed on May 31, 2021.

(30) Foreign Application Priority Data

Mar. 1, 2021 (CN) .......................... 202110227142.1

(51) Int. Cl.
*A63F 13/69* (2014.01)
*A63F 13/537* (2014.01)

(52) U.S. Cl.
CPC ............ *A63F 13/69* (2014.09); *A63F 13/537* (2014.09)

(58) Field of Classification Search
CPC ....... A63F 13/69; A63F 13/533; A63F 13/537
See application file for complete search history.

(56) References Cited

U.S. PATENT DOCUMENTS

| | | | |
|---|---|---|---|
| 7,156,762 B1 * | 1/2007 | Rondinelli | A63B 63/08 473/472 |
| 10,029,177 B2 * | 7/2018 | Linden | A63F 13/46 |
| 10,035,068 B1 * | 7/2018 | Wakeford | G06F 3/011 |
| 2005/0233804 A1 * | 10/2005 | Hata | A63F 13/75 463/29 |
| 2007/0155486 A1 * | 7/2007 | Futa | A63F 13/73 463/29 |
| 2008/0209527 A1 * | 8/2008 | Dudley | G06F 21/445 726/5 |
| 2008/0280683 A1 * | 11/2008 | Nakaji | H04L 67/131 463/40 |
| 2010/0210364 A1 * | 8/2010 | York | A63F 13/79 463/43 |
| 2013/0217492 A1 * | 8/2013 | Tsugihashi | A63F 13/213 463/31 |
| 2020/0051460 A1 * | 2/2020 | Bedor | G09B 19/22 |
| 2022/0167022 A1 * | 5/2022 | Bettner | H04L 65/613 |

FOREIGN PATENT DOCUMENTS

CN 111773689 A 10/2020

* cited by examiner

*Primary Examiner* — Steve Rowland

(57) ABSTRACT

A method and apparatus for switching a game mode, and an electronic device are disclosed. The method includes: receiving a game switching instruction in a current game mode; selecting a target game mode according to the game switching instruction; acquiring first game process data of the target game mode and game character data of the current game mode; running a game process of the target game mode according to the first game process data and the game character data.

16 Claims, 4 Drawing Sheets

METHOD AND APPARATUS FOR SWITCHING GAME MODE, AND ELECTRONIC DEVICE

CROSS REFERENCE TO RELATED APPLICATIONS

The present application is a Continuation Application of PCT Application No. PCT/CN2021/097404 filed on May 31, 2021, which claims the benefit of Chinese Patent Application No. 202110227142.1 filed on Mar. 1, 2021. All the above are hereby incorporated by reference in their entirety.

TECHNICAL FIELD

The present disclosure relates to the technical field of computers, and in particular, to a method and apparatus for switching a game mode, and an electronic device.

BACKGROUND

To improve the playability of video games, current video games usually provide players with multiple game modes. A user can play in different game modes. At present, each time a game mode is switched, the electronic device acquires game process data and game character data of the game mode, and then stores the game process data and the game character data into a memory, so as to run the game according to the data in the memory.

However, in this method, all the data in the game mode needs to be loaded each time the game mode is switched, which leads to a large amount of data to be reloaded during the switching process, thus causing high computing pressure to the electronic device running the relevant game client and also affecting the operation efficiency of the electronic device.

SUMMARY

An objective of the present disclosure is to solve at least one of the technical problems in the prior art, and provide a method and apparatus for switching a game mode and an electronic device, so as to reduce the data loading amount during switching of the game mode and improve the operation efficiency of the electronic device.

An embodiment of the present disclosure provides a method for switching a game mode, including:

receiving a game switching instruction in a current game mode;

selecting a target game mode according to the game switching instruction;

acquiring first game process data of the target game mode and game character data of the current game mode; and running a game process of the target game mode according to the first game process data and the game character data.

Further, the step of selecting a target game mode according to the game switching instruction includes:

generating, according to the game switching instruction, a switching interface for displaying game controls that correspond to game modes in a one-to-one manner;

selecting a target control from the game controls according to a game mode selection operation received in the switching interface; and determining the target game mode according to the target control.

Further, after generating, according to the game switching instruction, the switching interface for displaying the game controls that correspond to the game modes in a one-to-one manner, the method further includes:

moving the switching interface according to a sliding operation received in the switching interface; and displaying the corresponding game control on the switching interface when the switching interface is moved to a preset position.

Further, the step of acquiring first game process data of the target game mode and game character data of the current game mode includes:

acquiring the first game process data from a server; and replacing second game process data, corresponding to the current game mode, stored in a memory with the first game process data, and retaining the game character data in the memory.

Further, the method further includes:

updating the game character data according to the game process of the target game mode when the target game mode is a preset game mode.

Further, the game character data includes at least one of the following data: image data of a game character, health point data of the game character, and output value data of the game character.

Further, the game modes include a simulation game mode or a third person shooter game mode.

Further, in an embodiment of the present disclosure, an apparatus for switching a game mode is further provided, including:

an instruction receiving module, configured to receive a game switching instruction in a current game mode;

a mode selecting module, configured to select a target game mode according to the game switching instruction;

a data acquiring module, configured to acquire first game process data of the target game mode and game character data of the current game mode; and a game switching module, configured to run a game process of the target game mode according to the first game process data and the game character data.

Further, an embodiment of the present disclosure provides an electronic device, including a display screen, a memory, a processor, and a computer program stored in the memory and operable on the processor, wherein the processor, when executing the program, implements the method for switching a game mode described in the foregoing embodiment.

Further, an embodiment of the present disclosure provides a computer readable storage medium, wherein the computer readable storage medium stores a computer executable instruction, and the computer executable instruction causes a computer to perform the method for switching a game mode described in the foregoing embodiment.

Compared with the prior art, in the foregoing embodiments, after the game switching instruction is received in the current game mode and the target game mode is determined according to the target control selected based on the game switching instruction, the first game process data of the target game mode and the game character data of the current game mode are acquired, so as to run the game process of the target game mode according to the first game process data and the game character data. In this way, the game character data of the current game mode is still used during game mode switching, such that the game character data does not need to be reloaded during the game mode switching, to reduce the data loading amount during the game mode switching, thereby reducing the computing pressure of the electronic device running a game client and improving the operation efficiency of the electronic device.

In the foregoing embodiments, a switching interface is added to allow a user to reselect a game mode, to avoid direct switching of the game mode due to an accidental touch on the game interface.

In the foregoing embodiments, a display area of the switching interface is adjusted by receiving a sliding operation of a player, such that the game control can be displayed when the switching interface is moved to the preset position, to avoid that the game control cannot be selected due to incomplete display of the switching interface on the display screen.

In the foregoing embodiments, the second process data is replaced with the first process data, such that only the first game process data and the game character data for running the target game mode are retained in the memory, thereby reducing memory pressure of a user terminal.

In the foregoing embodiments, the game character data can be synchronized to any game mode by merely updating the game character data in the preset game mode. There is no need to update the game character data in each game mode, thereby reducing the computing amount of the user terminal, and improving the operation efficiency of the user terminal when running other game modes.

BRIEF DESCRIPTION OF THE DRAWINGS

The present disclosure is further described in detail below with reference to the accompanying drawings and embodiments.

DETAILED DESCRIPTION

The specific embodiments of the present disclosure are described in detail herein. The preferred embodiments of the present disclosure are shown in the accompanying drawings. The accompanying drawings are used to supplement the description of the textual part of the specification with graphics, such that each technical feature of the present disclosure and the overall technical solution can be understood vividly and intuitively, but the accompanying drawings should not be understood as a limitation on the protection scope of the present disclosure.

To improve the playability of video games, current video games usually provide players with multiple game modes. The game modes include a role-playing game (RPG) mode, an action role playing game (A-RPG) mode, a strategy role-playing game (S-RPG) mode, a multiplayer online battle arena (MOBA) mode, a shooter game (STG) mode, a first-person shooting game (FPS) mode, an action game (ACT) mode, a third personal shooting game (TPS) mode, and a simulation game (SLG) mode, etc. Users can play in different game modes. For example, a user exits the STG mode and enters the SLG mode. At present, each time a game mode is switched, an electronic device acquires game process data and game character data of the game mode. During switching from the STG mode to the SLG mode, the electronic device acquires a game level or task saved in the SLG mode and game character data saved in the SLG mode, such as quantity data of game characters, and then puts the data into a memory, so as to run the SLG mode according to the data in the memory.

However, in the foregoing method, the memory needs to acquire all the data in the game mode each time the game mode is switched. For example, during switching from the SLG mode to the STG mode, the game process data and the game character data saved in the STG mode need to be acquired. As a result, a large amount of data needs to be reloaded during the switching process, which brings high computing pressure to the electronic device running the relevant game client, and also affects the operation efficiency of the electronic device. Moreover, corresponding game process data and game character data need to be saved in each game mode, which leads to high storage pressure of the electronic device or cloud server for storing such data.

Figure 1:
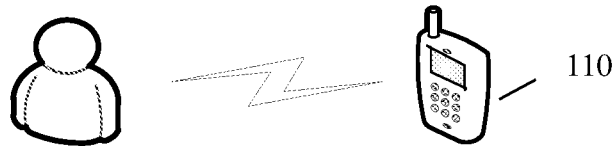
FIG. 1 is a diagram of an application environment of a method for switching a game mode according to an embodiment.

To solve the foregoing technical problems, FIG. 1 shows a diagram of an application environment of a method for switching a game mode according to an embodiment. Referring to FIG. 1, the method for switching a game mode is applied to a user terminal 110. The user terminal 110 may be an independent user terminal such as a cell phone, a tablet computer, a laptop computer, a wearable device, or a desktop computer. In the user terminal 110, in the current game mode, the user can send a game switching instruction by operating a game interface of the current game mode on the user terminal 110, wherein the operation may be clicking, sliding or text inputting, etc. The current game mode refers to a game mode running in the game client currently run by the user terminal, and the game mode may be any game mode. When the user terminal receives the game switching instruction sent by the user through the game interface of the current game mode, a target game mode is determined according to a target control selected from game controls corresponding to the game modes in a one-to-one manner according to the game switching instruction. The target game mode is a game mode associated with the target control of the same game client, wherein the target control is a UI control. After the target game mode is determined, the user terminal acquires first game process data of the target game mode and game character data of the current game mode according to the target game mode, so as to run a game process of the target game mode according to the first game process data of the target game mode and the game character data of the current game mode, i.e., to display a game interface of the game process of the target game mode on the screen of the user terminal. In this embodiment, game process data and game character data of each game mode are stored in advance in an internal memory of the user terminal. After determining the target game mode according to the selected target control, the user terminal can directly retrieve the first game process data and the game character data from the internal memory according to the target game mode to complete the game mode switching. It is unnecessary to acquire the game process data and the game character data from the Internet, such that the user terminal can complete the game mode switching offline.

Figure 2:
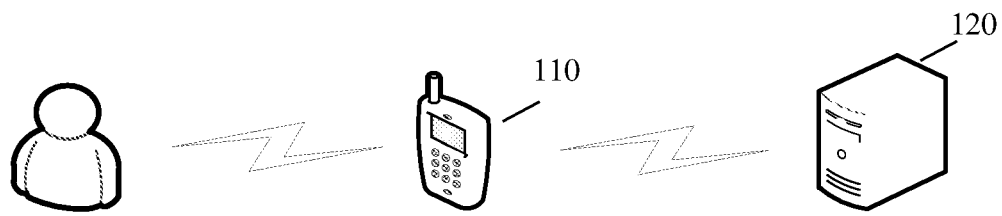
FIG. 2 is a diagram of another application environment of a method for switching a game mode according to an embodiment.

In an embodiment, FIG. 2 shows a diagram of another application environment of a method for switching a game mode according to an embodiment. In this application environment, a user terminal 110 is connected to a server 120 via a network, and the terminal 110 may specifically be a desktop terminal 110 or a mobile terminal 110, and the mobile terminal may be one of a cell phone, a tablet computer, a laptop computer, a wearable device, etc. The server 120 may be implemented by an independent server 120 or a server cluster composed of multiple servers 120, or may be a cloud server providing basic cloud computing services such as cloud services, a cloud database, cloud computing, cloud functions, cloud storage, network services, cloud communications, middleware services, domain name services, security services, CDN, and big data and artificial intelligence platforms. In this embodiment, the user terminal 110 may be used as the front end of a game client running the game, and the server 120 may be used as the back end of the game client. In this way, the server 120 can quickly establish a long connection with the user terminal 110 after acquiring a remote connection request sent by the game user in the user terminal 110 through the game client.

When the target game mode is determined, the user terminal 110 generates a corresponding data acquisition request according to the target game mode and sends the data acquisition request to the server 120, such that the server 120 sends first game process data and game character data to the user terminal 110 according to the data acquisition request. The user terminal 110 runs the game process of the target game mode according to the first game process data and the game character data sent by the server. In this embodiment, after determining the target game mode based on the selected target control, the user terminal requests the first game process data and the game character data from the server through the communication network to switch the game mode. It is unnecessary to store the character data locally in advance, which reduces the storage pressure of the user terminal.

It can be understood that the game modes for switching may be two or more, and the specific number of game modes for switching is not limited herein.

Since the rendering of virtual scenes consumes a certain amount of performance, a caching mechanism is introduced before the game mode switching. That is, map backgrounds of all the game modes are cached in the user terminal 110 or the server 120. During switching of the game mode, the cached map background can be found directly based on the map background, so that historical rendering data mapped by the cached map background will be quickly used as virtual rendering data of the map background to be rendered in the current switching. It means that once the map background in each game mode has been rendered, the map background can be directly retrieved from the cache during the game mode switching without performing rendering calculation for the map background again, thereby greatly reducing the consumption and occupation of physical rendering devices in the user terminal or the server.

After the game switching instruction is received in the current game mode and the target game mode is determined according to the target control selected based on the game switching instruction, the first game process data of the target game mode and the game character data of the current game mode are acquired, so as to run the game process of the target game mode according to the first game process data and the game character data. In this way, the game character data of the current game mode is still used during game mode switching, such that the game character data does not need to be reloaded during the game mode switching, to reduce the data loading amount during the game mode switching, thereby reducing the computing pressure of the electronic device running a game client and improving the operation efficiency of the electronic device.

The method for switching a game mode provided in the embodiments of the present disclosure will be illustrated in detail below through several specific embodiments.

Figure 3:
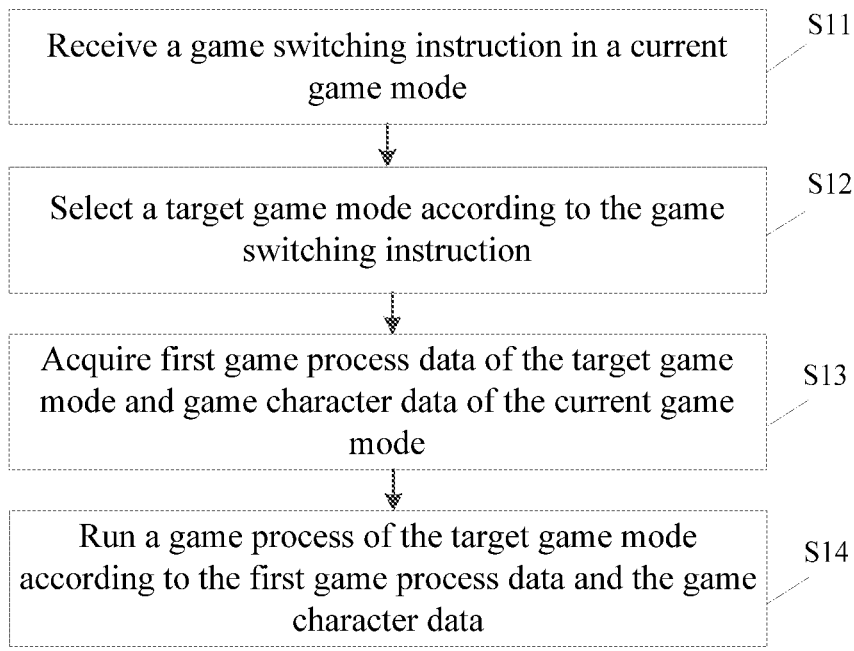
FIG. 3 is a schematic flowchart of a method for switching a game mode according to an embodiment.

As shown in FIG. 3, in an embodiment, a method for switching a game mode is provided. This embodiment is mainly described with an example in which the method is applied to a computer device. The computer device specifically may be the user terminal 110 in FIG. 1.

Referring to FIG. 3, the method for switching a game mode specifically includes the following steps:

S11: receive a game switching instruction in a current game mode.

In an embodiment, for example, the current game mode is the TPS mode; in the game interface of the game process in the TPS mode, the player can receive a game switching instruction by clicking on a preset UI control on the game interface, for example, clicking on a return button or a selection button associated with another game mode in the game interface. Alternatively, the user terminal can receive a game switching instruction by detecting any sliding operation performed by the player on the game interface, such as an upward sliding operation, a downward sliding operation, a leftward sliding operation, or a rightward sliding operation. Alternatively, the user terminal can directly generate a game switching instruction at the end of the game process of TPS mode.

S12: select a target game mode according to the game switching instruction.

In an embodiment, for example, the current game mode is the TPS mode; the target game mode may be determined according to the preset UI control selected by the player on the game interface of the game process in the TPS mode. If there is a UI control associated with the SLG mode on the game interface, it is determined that the target game mode is the SLG mode by receiving the player's operation on the UI control associated with the SLG mode. Alternatively, the upward sliding operation, the downward sliding operation, the leftward sliding operation and the rightward sliding operation on the game interface are associated with different game modes. For example, on the game interface, the upward sliding operation is associated with the SLG mode, the downward sliding operation is associated with the RPG mode, the leftward sliding operation is associated with the MOBA mode, and the rightward sliding operation is associated with the FPS mode. According to the received player operation, for example, when the upward sliding operation is received from the player, it is determined that the target game mode is the SLG mode.

When the game interface of the current game mode is operated, a sliding operation or a clicking operation may need to be performed on the game interface of the current game mode. For example, in the TPS mode, there may be a virtual wheel for operating a game character on the game interface. The operation on the virtual wheel may also cause the game interface to slide, while the operation on the game interface may cause an accidental touch on the preset UI control. Therefore, the method of directly determining the game mode by detecting the sliding of the game interface or by triggering the preset UI control may cause the game mode to be switched by mistake and affect the game experience.

Therefore, in an embodiment, the step of selecting a target game mode according to the game switching instruction includes:

generating, according to the game switching instruction, a switching interface for displaying game controls that correspond to game modes in a one-to-one manner. For example, the current game mode is the TPS mode; when the game switching instruction is received, according to the game switching instruction, the game interface in the TPS mode changes to a switching interface displaying the game controls of the game modes. The switching interface may be a main interface of the game, which presents multiple game controls in the form of a list, or can present multiple game controls associated to different areas of the switching interface. To facilitate user selection, the game controls may have different styles, i.e., different game controls are displayed as different control images. For example, if the game modes include the TPS mode and the SLG mode, the game control representing the TPS mode may be displayed as a dynamic image, and the game control representing the SLG mode may be displayed as a static image. Alternatively, different text contents are displayed in image areas corresponding to the game controls. For example, the text content "map" may be displayed in the image area corresponding to the game control representing the TPS mode, and the text content "explore" may be displayed in the image area corresponding to the game control representing the STG mode. After the switching interface is jumped to, the target control is selected among the game controls according to the game mode selection operation received in the switching interface. The selection operation may be a clicking or sliding operation on the game control in the switching interface. The target game mode is determined according to the target control. If the player does not select the game mode in the switching interface, it is possible to return to the current game mode through the return button of the switching interface. In this way, the switching interface is added to allow the user to reselect a game mode, to avoid direct switching of the game mode due to an accidental touch on the game interface.

Figure 4:
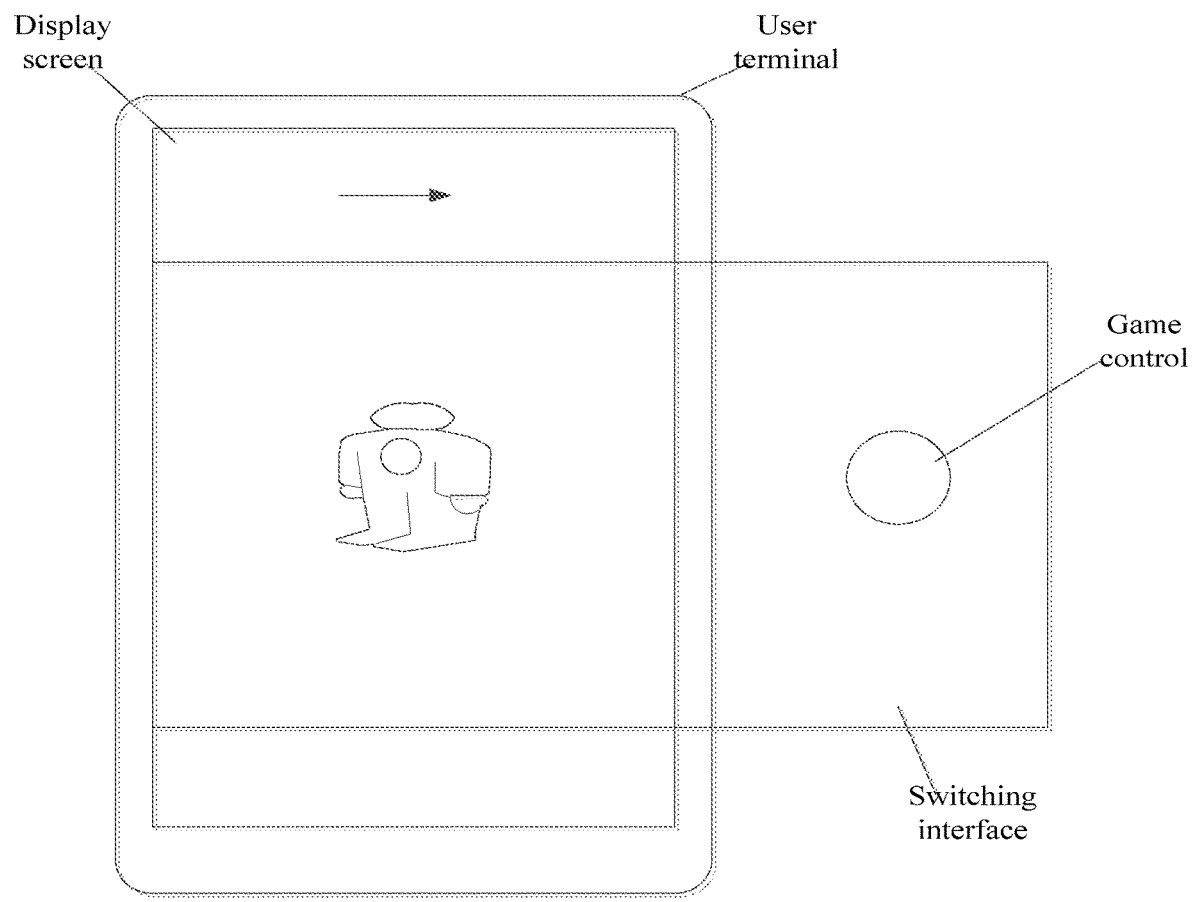
FIG. 4 is a schematic diagram of a switching interface displayed by a user terminal.
Figure 5:
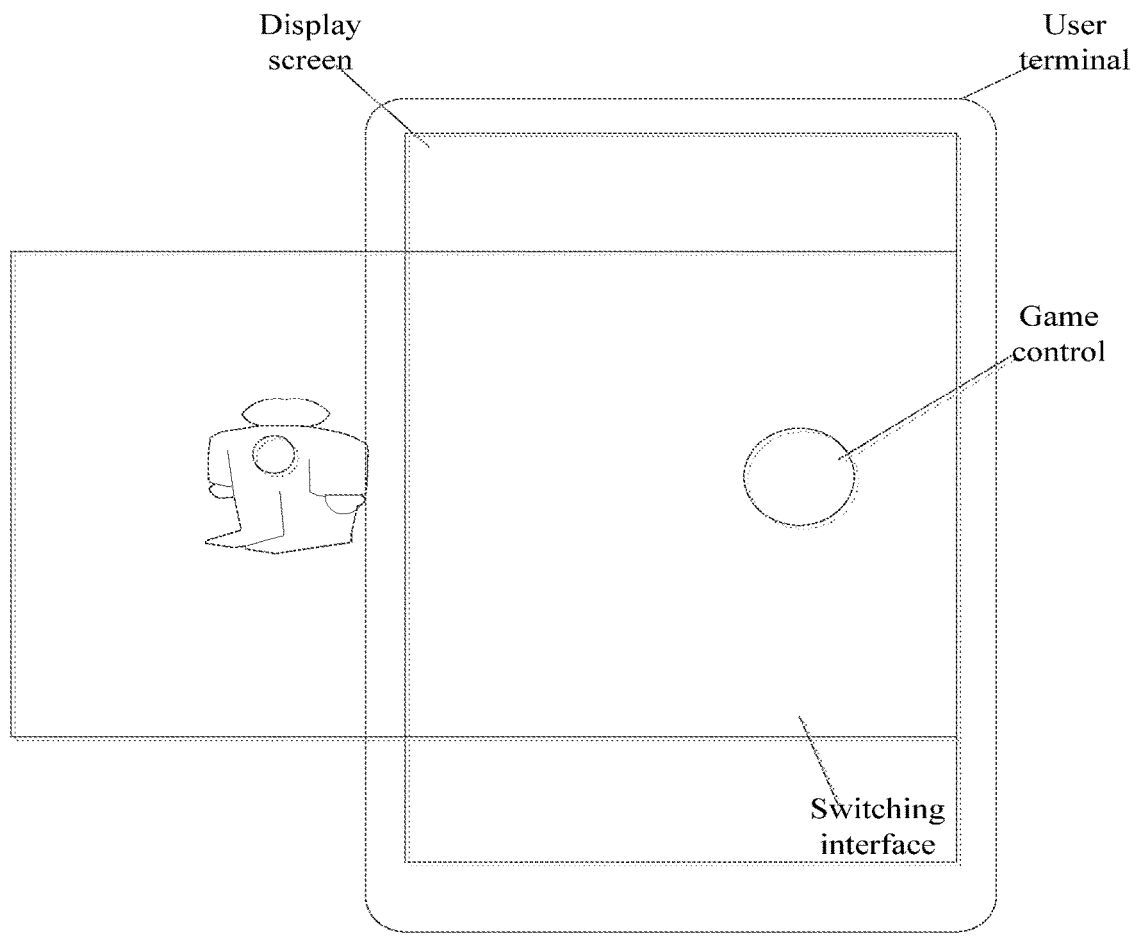
FIG. 5 is a schematic diagram of a switching interface displayed by the user terminal after sliding of the switching interface.

When the switching interface is the main interface of the game, the main interface of the game is usually large and may not be fully displayed due to the screen size of the user terminal. As shown in FIG. 4, the game control is located in the right area of the switching interface, while the main interface of the user terminal can only display the left area of the switching interface. As a result, there may be no game control in the main interface area displayed on the display screen of the user terminal, i.e. the game control is hidden, and thus the game mode cannot be switched. Therefore, in an embodiment, after generating the switching interface for displaying the game modes, the method further includes:

moving the switching interface according to a sliding operation received in the switching interface. The sliding operation can be any of an upward sliding operation, a downward sliding operation, a leftward sliding operation, and a rightward sliding operation. When the sliding operation is received, the user terminal moves the switching interface according to the sliding operation, such that the image area corresponding to the switching interface is displayed on the display screen of the user terminal. The corresponding game control is displayed on the switching interface when the switching interface is moved to a preset position. For example, the game control is located in the right area of the switching interface. When the right area of the switching interface is moved to the display screen according to the rightward sliding operation of the player, the game control is displayed on the display screen, as shown in FIG. 5. A display area of the switching interface is adjusted by receiving a sliding operation of a player, such that the game control can be displayed when the switching interface is moved to the preset position, to avoid that the game control cannot be selected due to incomplete display of the switching interface on the display screen.

S13: acquire first game process data of the target game mode and game character data of the current game mode.

Although the biggest difference between different game modes lies in different determining logic and game processes thereof, the game character data is universal among different game modes. Therefore, in an embodiment, for example, the current game mode is the TPS mode and the target game mode is the SLG mode; when the SLG mode is selected, the first game process data and the game character data of the TPS mode can be directly acquired from a physical memory of the user terminal according to the selected SLG mode, or the first game process data and the game character data of the TPS mode are acquired from the server according to the selected SLG mode. That is, the game character data in the TPS mode can be directly used as the game character data in the SLG mode without loading new game character data. The first game process data includes game task data and game level data of the SLG mode. The game character data includes image data of the game character, health point data of the game character and output value data of the game character. The game character is a virtual object manipulated by the player in any game mode, or consists of a virtual object manipulated by the player in any game mode and a secondary object that assists the virtual object in the in-game combat.

When the first game process data is acquired, second game process data corresponding to the current game mode may still be stored in the user terminal. To further reduce the memory pressure of the user terminal, in an embodiment, the step of acquiring the first game process data of the target game mode and the game character data of the current game mode includes:

acquiring the first game process data from a server; and replacing second game process data, corresponding to the current game mode, stored in a memory with the first game process data, and retaining the game character data in the memory. During switching of the game mode, the second process data and the game character data of the current game mode still exist in the memory of the user terminal. Therefore, the second process data is replaced with the first process data, such that only the first game process data and the game character data for running the target game mode are retained in the memory, thereby reducing memory pressure of the user terminal.

S14: run a game process of the target game mode according to the first game process data and the game character data.

In an embodiment, for example, the current game mode is the TPS mode and the target game mode is the SLG mode; game logic of the SLG mode and a game rule structure of the SLG mode are loaded according to the first game process data, and the game character data of the TPS mode in the memory is converted to the game character data in the SLG mode based on a preset numerical conversion formula. If blood data of the game character in the TPS mode is 1000, the blood data can be converted to 10000 in the SLG mode based on the numerical conversion formula. The numerical conversion formula may be adjusted according to actual situations, and is not described in detail herein. In order to reduce the computing amount of the user terminal, generally, the game character data of the TPS mode can be directly applied to the SLG mode.

To ensure user experience, the game character data needs to be updated. For example, the blood data of the game character needs to increase with the game process, to ensure that the player can clear the game process of different levels. Therefore, in an embodiment, when the target game mode is a preset game mode, the game character data is updated according to the game process of the target game mode. The preset game mode may be any game mode, such as the TPS mode. The game character data is universal in the game modes. Therefore, the game character data can be synchronized to any game mode by merely updating the game character data in the preset game mode. There is no need to update the game character data in each game mode, thereby reducing the computing amount of the user terminal, and improving the operation efficiency of the user terminal when running other game modes.

Figure 6:
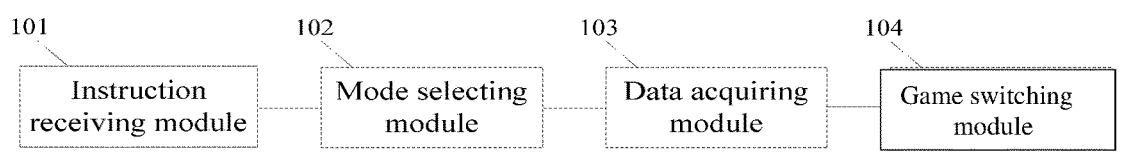
FIG. 6 is a schematic structural diagram of an apparatus for switching a game mode according to an embodiment.

In an embodiment, as shown in FIG. 6, an apparatus for switching a game mode is provided, including:

an instruction receiving module 101, configured to receive a game switching instruction in a current game mode;

a mode selecting module 102, configured to select a target game mode according to the game switching instruction;

a data acquiring module 103, configured to acquire first game process data of the target game mode and game character data of the current game mode; and a game switching module 104, configured to run a game process of the target game mode according to the first game process data and the game character data. The game character data includes at least one of image data of a game character, health point data of the game character, and output value data of the game character.

In an embodiment, the mode selecting module 102 is specifically configured to: generate, according to the game switching instruction, a switching interface for displaying game controls that correspond to game modes in a one-to-one manner; select a target control from the game controls according to a game mode selection operation received in the switching interface; and determine the target game mode according to the target control. The game modes include a simulation game mode or a third person shooter game mode.

In an embodiment, the mode selecting module 102 is further configured to: move the switching interface according to a sliding operation received in the switching interface; and display the corresponding game control on the switching interface when the switching interface is moved to a preset position.

In an embodiment, the data acquiring module 103 is specifically configured to: acquire the first game process data from a server; and replace second game process data, corresponding to the current game mode, stored in a memory with the first game process data, and retain the game character data in the memory.

In an embodiment, the game switching module 104 is further configured to: update the game character data according to the game process of the target game mode when the target game mode is a preset game mode.

In this embodiment of the present disclosure, the instruction receiving module 101, the mode selecting module 102, the data acquiring module 103, and the game switching module 104 each may be one or more processors or chips that have a communication interface to implement a communications protocol, and may further include a memory and relevant interfaces, a system transmission bus, and the like if necessary. The one or more processors or chips execute program-related code to implement corresponding functions. Alternatively, the instruction receiving module 101, the mode selecting module 102, the data acquiring module 103, and the game switching module 104 may share an integrated chip or share a processor, a memory, a display and other devices. The shared processor or chip executes the program-related code to implement the corresponding functions.

Figure 7:
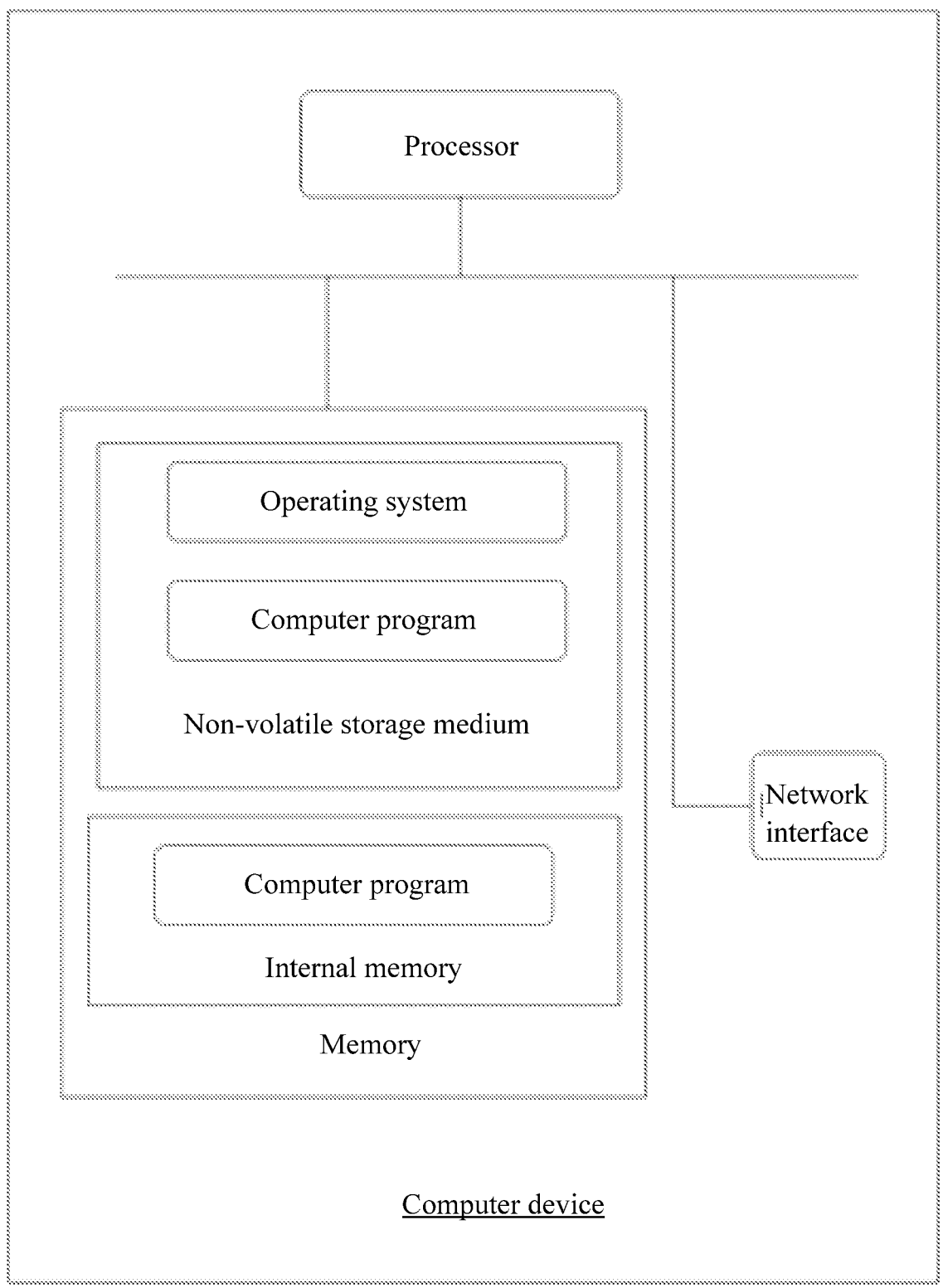
FIG. 7 is a structural block diagram of a computer device according to an embodiment.

In an embodiment, an electronic device, that is, a computer device, is provided. As shown in FIG. 7, the computer device includes a processor, a memory, a network interface, an input apparatus and a display screen that are connected through a system bus. The memory includes a non-volatile storage medium and an internal memory. The non-volatile storage medium of the computer device stores an operating system, and may also store a computer program. The computer program, when executed by the processor, causes the processor to implement the method for switching a game mode. The internal memory may also store a computer program. The computer program, when executed by the processor, may cause the processor to perform the method for switching a game mode. Those skilled in the art may understand that the structure shown in FIG. 7 is only a block diagram of a partial structure related to the solution of the present disclosure and does not constitute a limitation on the computer device to which the solution of the present disclosure is applied. Specifically, the computer device may include more or fewer components than those shown in the figure, or some components may be combined, or a different component arrangement may be used.

In an embodiment, the apparatus for switching a game mode provided in the present disclosure may be implemented in the form of a computer program. The computer program may be run on the computer device shown in FIG. 7. The memory of the computer device may store various program modules forming the apparatus for switching a game mode. The computer program formed by the program modules causes a processor to perform the steps of the method for switching a game mode according to the embodiments of the present disclosure as described in this specification.

In an embodiment, a computer readable storage medium is provided. The computer readable storage medium stores a computer executable instruction, and the computer executable instruction causes a computer to perform the method for switching a game mode described in the foregoing embodiment. The steps of the method for switching a game mode herein may be steps in the method for switching a game mode in the foregoing embodiments.

The above merely describes preferred embodiments of the present disclosure. It should be noted that, several improvements and modifications may be made by those of ordinary skill in the art without departing from the principle of the present disclosure, and these improvements and modifications should also be considered within the scope of protection of the present disclosure.

Those of ordinary skill in the art can understand that all or some of processes for implementing the methods of the foregoing embodiments can be completed by instructing relevant hardware through a computer program. The program may be stored in a computer readable storage medium. When the program is executed, processes of the embodiments of the foregoing methods may be included. The storage medium may be a magnetic disk, an optical disc, a read-only memory (ROM), a RAM, or the like.

The invention claimed is:

1. A method for switching a game mode, comprising:
   receiving a game switching instruction in a current game mode;
   selecting a target game mode according to the game switching instruction;
   acquiring first game process data of the target game mode and game characters data of the current game mode; and
   running a game process of the target game mode according to the first game process data and the game characters data;
   wherein the step of selecting a target game mode according to the game switching instruction comprises:
   generating, according to the game switching instruction, a switching interface for displaying game controls that correspond to game modes in a one-to-one manner;
   selecting a target control from the game controls according to a game mode selection operation received in the switching interface; and
   determining the target game mode according to the target control;
   wherein after generating, according to the game switching instruction, the switching interface for displaying the game controls that correspond to the game modes in a one-to-one manner, further comprising:
   moving the switching interface according to a sliding operation received in the switching interface; and
   displaying the corresponding game control on the switching interface when the switching interface is moved to a preset position.

2. A method for switching a game mode, comprising:
   receiving a game switching instruction in a current game mode;
   selecting a target game mode according to the game switching instruction;
   acquiring first game process data of the target game mode and game characters data of the current game mode; and
   running a game process of the target game mode according to the first game process data and the game characters data;
   wherein the step of acquiring first game process data of the target game mode and game characters data of the current game mode comprises:
   acquiring the first game process data from a server; and
   replacing second game process data, corresponding to the current game mode, stored in a memory with the first game process data, and retaining the game characters data in the memory.

3. The method for switching a game mode according to claim 1, further comprising:
   updating the game characters data according to the game process of the target game mode when the target game mode is a preset game mode.

4. The method for switching a game mode according to claim 1, wherein the game characters data comprises at least one of the following data: image data of game characters, health point data of the game characters, and output value data of the game characters.

5. The method for switching a game mode according to claim 2, wherein the game characters data comprises at least one of the following data: image data of game characters, health point data of the game characters, and output value data of the game characters.

6. The method for switching a game mode according to claim 3, wherein the game characters data comprises at least one of the following data: image data of game characters, health point data of the game characters, and output value data of the game characters.

7. The method for switching a game mode according to claim 1, wherein the game modes comprise a simulation game mode or a third person shooter game mode.

8. The method for switching a game mode according to claim 2, wherein the game modes comprise a simulation game mode or a third person shooter game mode.

9. The method for switching a game mode according to claim 3, wherein the game modes comprise a simulation game mode or a third person shooter game mode.

10. An apparatus for switching a game mode, comprising:
    an instruction receiving module, configured to receive a game switching instruction in a current game mode;
    a mode selecting module, configured to select a target game mode according to the game switching instruction;
    a data acquiring module, configured to acquire first game process data of the target game mode and game characters data of the current game mode; and
    a game switching module, configured to run a game process of the target game mode according to the first game process data and the game characters data;
    wherein the mode selecting module is specifically configured to: generate, according to the game switching instruction, a switching interface for displaying game controls that correspond to game modes in a one-to-one manner; select a target control from the game controls according to a game mode selection operation received in the switching interface; and determine the target game mode according to the target control;
    wherein the mode selecting module is further configured to: move the switching interface according to a sliding operation received in the switching interface; and display the corresponding game control on the switching interface when the switching interface is moved to a preset position.

11. An electronic device, comprising a display screen, a memory, a processor, and a computer program stored in the memory and operable on the processor, wherein the processor, when executing the program, implements the method for switching a game mode as defined in claim 1.

12. A non-transitory computer readable storage medium, storing a computer program, wherein the computer program is suitable to be loaded and executed by the processor, to cause a computer device having the processor to perform the method as defined in claim 1.

13. The method for switching a game mode according to claim 2, further comprising:
    updating the game characters data according to the game process of the target game mode when the target game mode is a preset game mode.

14. An apparatus for switching a game mode, comprising:
    an instruction receiving module, configured to receive a game switching instruction in a current game mode;
    a mode selecting module, configured to select a target game mode according to the game switching instruction;
    a data acquiring module, configured to acquire first game process data of the target game mode and game characters data of the current game mode; and
    a game switching module, configured to run a game process of the target game mode according to the first game process data and the game characters data;
    wherein the data acquiring module is specifically configured to: acquire the first game process data from a server; and replace second game process data, corresponding to the current game mode, stored in a memory with the first game process data, and retain the game character data in the memory.

15. An electronic device, comprising a display screen, a memory, a processor, and a computer program stored in the memory and operable on the processor, wherein the processor, when executing the program, implements the method for switching a game mode as defined in claim 2.

16. A non-transitory computer readable storage medium, storing a computer program, wherein the computer program is suitable to be loaded and executed by the processor, to cause a computer device having the processor to perform the method as defined in claim 2.

\* \* \* \* \*